United States Patent [19]

Blatt et al.

[11] 4,240,467

[45] Dec. 23, 1980

[54] VALVE ASSEMBLY

[76] Inventors: Leland F. Blatt; L. Douglas Blatt, both of 31915 Groesbeck Highway, Fraser, Mich. 48026

[21] Appl. No.: 3,410

[22] Filed: Jan. 15, 1979

[51] Int. Cl.$^3$ .............................................. F15B 13/042
[52] U.S. Cl. ........................... 137/625.66; 137/625.69; 251/324; 251/DIG. 1; 277/177
[58] Field of Search ...................... 137/625.66, 625.69; 251/324, DIG. 1; 277/177, 189, 227, 228, DIG. 6

[56] References Cited

U.S. PATENT DOCUMENTS

| 2,360,734 | 10/1944 | Smith ................................... 277/177 |
| 2,920,650 | 1/1960 | Moog ............................... 137/625.69 |
| 3,017,901 | 1/1962 | Hicks .............................. 251/DIG. 1 |
| 3,212,522 | 10/1965 | Williams ....................... 137/625.69 X |
| 3,515,442 | 6/1970 | Munroe ........................... 137/625.66 |
| 3,542,073 | 11/1970 | Holbrook ........................ 137/625.66 |
| 3,918,726 | 11/1975 | Kramer ................................ 277/227 |
| 3,985,337 | 10/1976 | Gripe et al. ................... 251/DIG. 1 |

*Primary Examiner*—Gerald A. Michalsky
*Attorney, Agent, or Firm*—Cullen, Sloman, Cantor, Grauer, Scott & Rutherford

[57] ABSTRACT

A valve assembly has an elongated body with an axial bore defining a valve seat, with axially apertured end caps sealed over opposite ends thereof and with the body having therein a series of pressure, cylinder and exhaust ports. A valve spool is reciprocally nested within said bore and at its ends is sealed and movably supported therein for controlling flow of pressure fluids through the respective ports. A coil spring is seated within one end cap and is biased against one end of the spool urging the spool to one control position. The other end cap is adapted for connection to a source of pressurized pilot air for moving the spool when energized to a second control position. The spool has an axial portion and a plurality of spaced, radially projecting valve seal supporting portions with a plurality of pairs of annular grooves formed in said supporting portion to define axial seal supports of predetermined length. An annular apertured flexible valve seal is loosely nested in each groove and loosely mounted upon the axial support, the base of such seal being of an axial width less than the length of said axial support. The valve seal has an annular rim portion of decreasing width towards its periphery, is transversely rounded at its outer edge and is of a diameter greater than said bore for flexing sealing engagement with the valve seat and to form a fluid tight contact with the bore. Rim portions of the seals are movable over the valve seat with a minimum of friction and the seal bases are adapted for a limited action movement on their axial supports for reducing resistance of the spool when reciprocated for its control movements. The spool is under size with respect to the bore so that O-ring seals adjacent its opposite ends loosely and supportably and sealingly mount the valve spool within the valve body as its sole support to provide a floating relationship of the spool within the valve body. The outer rim of each valve seal is of a relatively high Durometer, is less flexible and of sufficient hardness to reduce the frictional contact thereof with the valve seat. The base portion of each valve seal is of increased resiliency and lower Durometer for ease of flexibility and expansion upon its axial support.

11 Claims, 3 Drawing Figures

VALVE ASSEMBLY

BACKGROUND OF THE INVENTION

Heretofore, various types of valve assemblies have been contructed for the primary purpose of controlling the flow of pressure air or other pressure fluid to opposite ends of a cylinder assembly and with porting for controlling the flow of exhaust out through the valve assembly. An example of such prior art contruction is shown in U.S. Pat. No. 3,017,901 entitled "Valve Assembly".

In that contruction within the bore of the body there is provided a series of rings 32, a series of spacers 34 and seals 36 in conjunction with valve stem guides 38 with central bores all to define together, a bore within which is movably mounted the valve spool. The objection to such contruction is that it is highly complicated and costly to maufacture and is too complex. One purpose for the use of such ring spacers, seals and valve stem guides was to allow greater tolerance between the diameter of the rings and the valve body sealed with the O-rings, and providing for operation of the spool despite some distortion of the body.

SUMMARY OF THE INVENTION

It is an object of the present invention to provide an improved valve assembly which eliminates the series of annular rings, spacers, seals and valve guides shown in U.S. Pat. No. 3,017,901 and to therein provide an improved valve wherein the body merely has a longitudinal bore within which the valve spool is floatingly mounted and sealed for a minimum of friction therein.

It is another object to provide an improved valve spool contruction which includes axial portions and spaced radial portions with annular grooves in said radial portions for receiving and supporting annular apertured flexible valve seals.

A further object is to provide an improved annular valve seal whose maximum diameter is greater than said bore so that the seal at all times is biased against said bore and the corresponding valve seat for a fluid tight contact therewith.

It is another object to provide an improved apertured valve seal of a flexible contruction, of Buna rubber or other plastic material and wherein the outer rim portion thereof is of a relatively high Durometer which is hard and less flexible for friction minimizing engagement with the valve seat and wherein the base portion of the seal is of a lower Durometer for increased flexibility for a floating mounting thereof upon the valve spool, all for minimizing frictional engagement of the valve spool with respect to the valve seat during reciprocal movements of the valve spool and for the further purpose of minimizing breakaway of the valve spool with respect to said bore and reduce the amount of energy required to move the valve spool into its respective control positions.

These and other objects will be seen from following specification and claims in conjunction with the appended drawing.

DRAWING

It will be understood that the above drawing illustrates merely a preferred embodiment of the invention, and that other embodiments are contemplated within the scope of the claims hereafter set forth.

Figure 1:
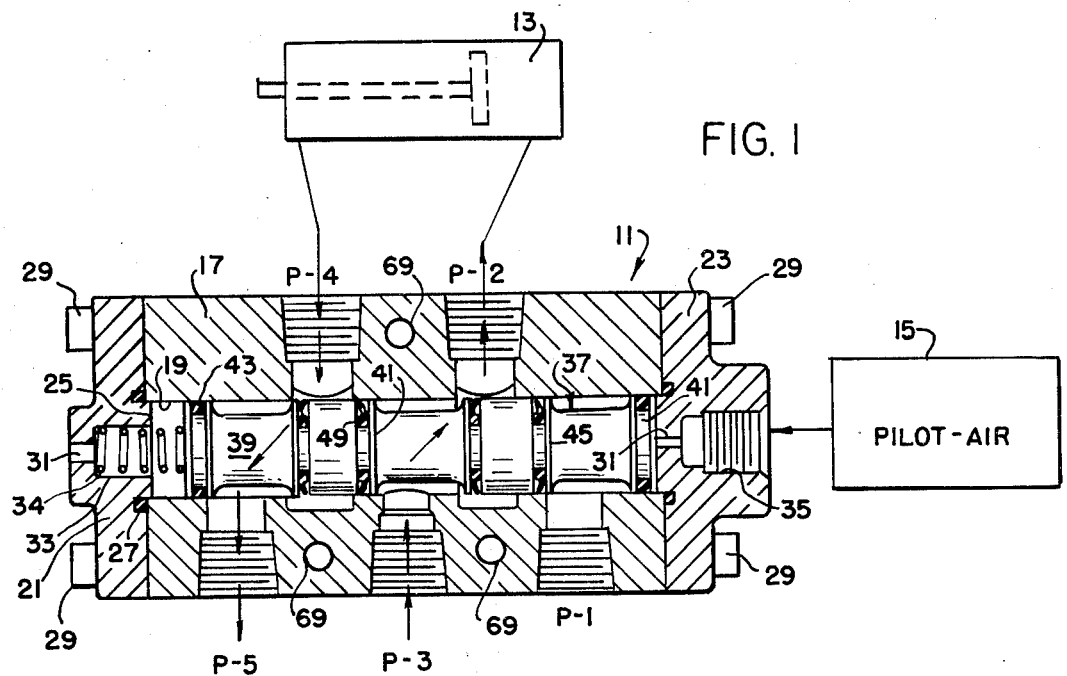
FIG. 1 is a longitudinal section of the present valve assembly connected to a cylinder assembly schemtically shown showing the connection of a pilot air control.
Figure 3:
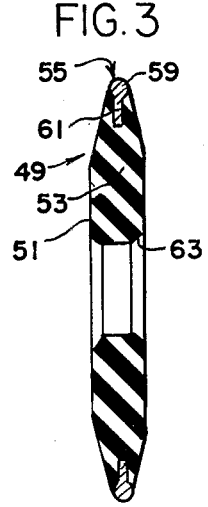
FIG. 3 is a vertical section on an increased scale of one form of valve seal employed.

Referring to the drawing, FIGS. 1 and 3, the present improved valve assembly is generally indicated at 11, FIG. 1, connected to the cylinder assembly 13 as schematically shown, and includes an metallic body 17 which has pressure port P3, cylinder ports P2 and P4 and exhaust ports P1 and P5.

The box 15 schematically illustrates the connection of an operating pilot air assembly connected to the end cap 23 at one end of the valve body.

The valve body has a longitudinal bore 19 adapted to define for the valve an annular valve seat. End cap 21 and pilot end cap 23 are mounted over opposite ends of said body. Each end cap includes an annular boss 25 which is snugly projected into the bore 19 with the end caps secured to said body by the series of fasteners 29.

Upon the inner surface of the end caps is an annular groove outwardly of the respective boss within which is compressively nested the O-ring seal 27 for operative and sealing engagement with the valve body.

Each of the end caps have an axial aperture 31. End cap 21 has inwardly of such aperture a bore 33 defining a spring seat for the coil compression spring 34. The other end cap 23 outwardly of aperture 31 has an enlarged bore 35 adapted to receive a suitable fitting for connection by conduit to operating pilot air assembly 15.

Elongated valve spool 37 includes axial portions 39 and a series of longitudinally spaced, radially extending annular seal supports 41. A series of longitudinally spaced annular grooves 45 are formed in said seal supports to define within said spool a series of longitudinally spaced annular channels. Nested in grooves in the outer most seal supports are a pair of O-ring seals 43 which project radially outward of the spool and are adapted for supporting and sealing engagement with the annular valve seat or bore 19 by which the spool is loosely and reciprocally nested within said bore and wherein its ends are sealed therein. The spaced O-ring seals serve as or sole support for the spool within said bore so that longitudinal reciprocal movements thereof are accomplished with a minimum of friction relative to the valve seat.

Within the remaining annular grooves 45, there is loosely positioned the annular apertured valve seals 49 of a flexible material such as Buna rubber or other flexible plastic material.

Figure 2:
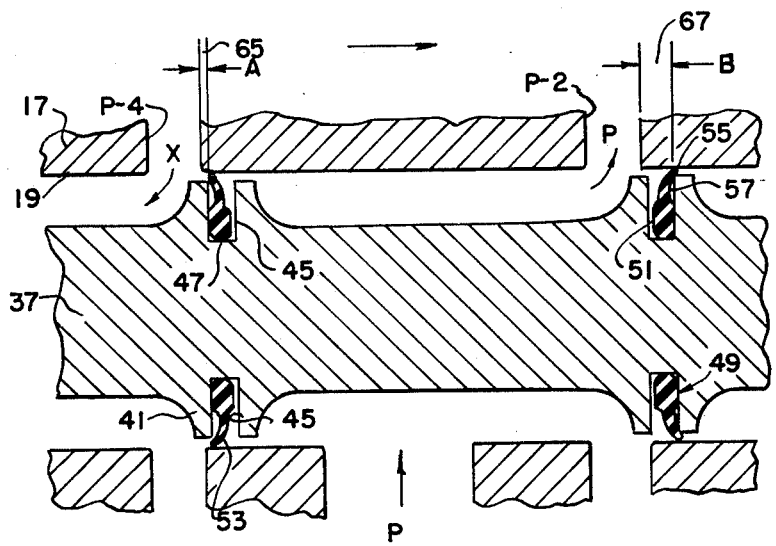
FIG. 2 is a fragmentary longitudinal section on an enlarged scale with the valve spool and an associated body cut away to illustrate the relationship of the valve seals with respect to the spool and the annular valve seat.

Each valve seal has an annular base 51 which has a width less than the length of the axial support 47, FIG. 2 and is adapted for relative longitudinal movement within the respective groove 45.

Outwardly of said base each valve seal has an annular rim portion 53 of decreasing width towards its periphery and has an annular transversely rounded edge 55 adapted for operative sliding and sealing engagement with respect to said valve seat.

The rim portion of said seal has a diameter which is greater than said bore so that the rim portion and outer edge thereof are in flexing and sealing engagement with the valve seat and relative to the ports therein, FIGS. 1 and 2 to form a fluid tight contact with said bore and valve seat. The valve seal is constructed so that the outer rim portion 53 and including the outer annular rounded edge 55 is of a higher Durometer than the seal base 51. This provides for less resiliency of the rim portion and providing a harder but low friction edge for engagement with the valve seat.

Inner portions of the rim and base are of a lower Durometer with respect to the outer portion to provide for increase resiliency and for ease of flexing and expanding of said base to facilitate axial adjusting movement of the seal base upon its axial support 47.

Outer side portions of the seal rim are arcuate as at 57 to improve the flexibility of the seal and for the purpose of minimizing its frictional contact with the valve seat.

One form of valve seal is shown at 49 in FIG. 3, as a vertical section, and wherein there is a ball 59, or annulus having a radial shank 61 nested within the rim 53 during the molding process.

The annulus 59 and its associated radial shank 61 is of a resilient material but of higher Durometer and hardness with respect to the rim portion 53 for low frictional engagement with the valve seat.

The rim portion 53 is constructed of a lower Durometer material for increased flexibility and for ease of flexing and expansion of the valve seal within the annular groove 45 and over and along the length of axial support 47.

As shown in FIG. 3, the inner annular portion of the valve seal base is chamferred at 63, or rounded as shown in FIG. 2 for reduced area of contact of the seal with respect to the spool where it is mounted on the axial support 47. This facilitates flexing movements of the valve seal and reduces frictional contact of the seal with respect to the spool and thus facilitates flexing movement of the valve seal itself for maintaining an airtight sealing engagement with the annular valve seat 19. This reduces the resistance of the spool to reciprocal control movements. The seal rim outer edges 55 in effect, roll over the body during reciprocal movements of the spool to facilitate break-away therefrom. At the same time, air pressure from the pressurized port is applied to the adjacent seals for expanding them against the valve seat and creating a bubble tight seal onto the annular valve seat.

Referring to FIG. 2, the spaced, annular grooves 45 which loosely support the valve seals are longitudinally off-set and spaced apart a distance which is slightly greater than the center distance between an adjacent pair of ports such as shown in FIG. 2. This limits the length of longitudinal movement of the seal along the bore and relative to a particular fluid port uncovering one port and sealing another port. By this construction, only one of the seals contact said valve seat at a time to lower the break-away friction of the seal with respect to the body bore and to reduce operating friction.

This offset spacing of the grooves is shown in FIG. 2 at 65 showing an offset distance A and at 67 offset distance B which is different from the offset A. By this offset spacing of the grooves 45 and seals therein, the break-away friction and operating friction are reduced.

Formed through the body 17 outwardly of its bore are a plurality of transverse apertures 69 adapted to receive fasteners for mounting and securing the valve body to a suitable support surface.

By placing the apertures closely adjacent said bore, and inwardly of the outer edge portions of the body, FIG. 1, there is provided is shortened distance for bending moment should the valve body be attached on an uneven support.

OPERATION

In the illustrative embodiment, the present improved valve assembly is a four-way five-port valve of a simple construction which is pilot air operated at 15 with a spring return as shown at 34.

It is contemplated as an equivalent construction that instead of being pilot air operated against the action of the spring 34, the spool could be manually activated by hand control or foot control or other leverage device for reversing the operation of the valve assembly. It is further contemplated that the pilot air control could be replaced by a solenoid operated device for acting against one end of the valve spool. Alternatively, instead of the spring and pilot air shown in FIG. 1, a pilot air operator could be provided at opposite ends of the valve body for controlling alternate movements of the valve spool.

The valve body 17 is bored with the necessary undercuts to allow for air flow through ports P1-P5. The valve body is furthermore ported in the five places shown in FIG. 1. Various kinds of operators may be applied to opposite ends of the valve body for effecting reciprocal movements of the valve spool.

The new seal design includes a low resilient material on the marginal portion, of a hard, high Durometer frictionless material as shown in detail in FIG. 3. The apertured body portion 51 of the valve seal is of a lower Durometer than the rim portion for increased flexibility and expandability and for a suitable floating mounting upon the associated axial portion of the valve spool.

The present construction provides a means for reducing friction and eliminating many of the parts shown in the old configuration of U.S. Pat. No. 3,017,901. In operation FIG. 1 illustrates a normal position of the valve spool with the spring 34 keeping the spool 37 seated toward the pilot air position. With pnumatic pressure present at P3, flow is directly through the valve exhausting at P2 while P4 is open and exhausting through P5. When pilot air at 35 sufficient to overcome the compression of spring 34, the valve spool acting as a piston, sealed by the O-rings 43, moves toward the spring 34. As the spool is moving, the thin lip seals 49 are upset with a rolling, flexing action which reduces seal break-out or break-away. As the spool comes to rest in the pressurized position, pneumatic pressure is then directed from P3 through P4. Any pressure at port P2 is then exhausted through port P1. As air pressure is applied to the seals, then expand against the bore, creating a bubble tight seal on said bore. Exhausting the pilot air causes the spool to be shifted to the normal posiion shown in the drawing under the action of the coil spring 34.

The present valve assembly could be provided as a three-way or four-way neutral center type.

Having described our invention, reference should now be had to the following claims:

We claim:

1. A valve assembly comprising an elongated body having an axial bore defining an annular valve seat;
    axially apertured end caps sealed over and secured to opposite ends of said body;
    said body having a pressure port, cylinder ports and exhaust ports;

a valve spool loosely and reciprocally nested within said bore and at its ends sealed and movably supported within said bore, for controlling flow of pressure fluid through the respective ports;

a coil spring seated within one end cap and biased against one end of said spool, urging said spool to one control position at one end of said bore;

the other end cap adapted for connection to a source of pressurized pilot operating air for moving said spool when energized, to a second control position at the other end of said bore;

said spool including an axial portion and a plurality of spaced radially projecting axially spaced valve seal supporting portions intermediate its ends, there being a series of longitudinally spaced pairs of annular grooves in said valve seal supporting portions, each defining an axial seal support of predetermined length;

and an annular apertured valve seal of flexible material loosely nested in each groove, and loosely mounted upon said axial supports, respectively;

the base of each seal having an axial width less than the length of each axial seal support;

each seal having an annular rim portion of decreasing width towards its periphery and transversely rounded at its outer edge, and of a diameter greater than said bore for flexing sealing engagement with said valve seat relative to said ports to form a fluid-tight contact with said bore;

said rim portions of said seals being movable over said valve seat with a minimum of friction and said seal bases adapted for limited axial movement on said axial supports, reducing the resistance of said spool to reciprocal control movements thereof, said seal rim outer edges rolling on said body to facilitate break-away therefrom, air pressure applied to said pressure port operatively acting upon the adjacent seals expanding them against said valve seat, creating a bubble-tight seal on said bore;

the sealing and supporting of said spool including annular channels adjacent opposite ends of said spool;

and a flexible O-ring nested in each channel and projecting radially outward of said spool spacing said spool from said valve seat and serving as the sole support of said spool within said bore, said spool floating within said bore;

the rim of each valve seal being of low resiliency hard frictionless material of high Durometer creating a diaphragm action, the base of each seal being of increased resiliency and of a lower Durometer for ease of flexiblity and expansion upon its axial support.

2. In the valve assembly of claim 1, said rim being in the form of a ball and shank molded into an intermediate portion of said seal.

3. In the valve assembly of claim 1, said rim portion including a ball with a radial shank, of high Durometer, low resiliency imbedded and molded into an intermediate inner portion of each seal;

said intermediate inner portion and base of each seal being of a lower Durometer and of increased resiliency.

4. In the valve assembly of claim 3, the base of each seal at its aperture being rounded for reduced contact with its axial support and for increased flexing movement within the corresponding groove and for free floating upon said spool.

5. In the valve assembly claim 3, the base of each seal at its aperture being chamfered on opposite sides for reduced contact with its axial support and for increased flexing movement within the corresponding groove and for free floating upon said spool.

6. A valve assembly comprising an elongated body having an axial bore defining an annular valve seat;

axially apertured end caps sealed over and secured to opposite ends of said body;

said body having a pressure port, cylinder ports and exhaust ports;

a valve spool loosely and reciprocally nested within said bore and at its ends sealed and movably supported within said bore, for controlling flow of pressure fluid through the respective ports;

first operator means on one end cap engageable with said spool, moving said spool to one control position at one end of said bore;

second operator means on the other end cap for moving said spool, when energized, to a second control position at the other end of said bore;

said spool including an axial portion and a plurality of spaced radially projecting axially spaced valve seal supporting portions, there being a series of longitudinally spaced pairs of annular grooves in said valve seal supporting portions, each defining an axial seal support of predetermined length;

and an annular apertured valve seal of flexible material loosely nested in each groove, and loosely mounted upon said axial supports, respectively;

the base of each seal having an axial width less than the length of each axial seal support;

each seal having an annular rim portion of decreasing width towards its periphery and transversely rounded at its outer edge, and of a diameter greater than said bore for flexing sealing engagement with said valve seat relative to said ports to form a fluid-tight contact with said bore;

said rim portions of said seals being movable over said valve seat with a minimum of friction and said seal bases adapted for limited axial movement on said axial supports, reducing the resistance of said spool to reciprocal control movements thereof, said seal rim outer edges rolling on said body to facilitate break-away therefrom, air pressure applied to said pressure port operatively acting upon the adjacent seals expanding them against said valve seat, creating a bubble-tight seal on said bore;

the sealing and supporting of said spool including annular channels adjacent opposite ends of said spool;

and a flexible O-ring seal nested in each channel and projecting radially outward of said spool, spacing said spool from said valve seat and serving as the sole support of said spool within said bore, said spool floating within said bore;

the rim of each valve seal being of low resiliency hard frictionless material of high Durometer creating a diaphragm action, the base of each seal being of increased resiliency and of a lower Durometer for ease of flexibility and expansion upon its axial support.

7. In the valve assembly of claim 6, said rim being in the form of an annular and radial web molded into an intermediate portion of said seal.

8. In the valve assembly of claim 6, the rim of each valve seal being of low resiliency hard friction-less material of high Durometer creating a diaphragm action, the base of each seal being of increased resiliency and of a lower Durometer for ease of flexibility and expansion upon its axial support;

said rim being in the form of a ball and shank molded into an intermediate portion of said seal.

9. In the valve assembly of claim 6, the rim of each valve seal being of low resiliency hard friction-less material of high Durometer creating a diaphragm action, the base of each seal being of increased resiliency and of a lower Durometer for ease of flexibility and expansion upon its axial support, said rim portion including a ball with a radial shank, of high Durometer, low resiliency imbedded and molded into an intermediate inner portion of each seal; said intermediate inner portion and base of each seal being of a lower Durometer and of increased resiliency.

10. In the valve assembly of claim 9, the base of each seal at its aperture being rounded for reduced contact with its axial support and for increased flexing movement within the corresponding groove and for free floating upon said spool.

11. In the valve assembly of claim 9, the base of each seal at its aperture being chamfered on opposite sides for reduced contact with its axial support and for increased flexing movement within the corresponding groove and for free floating upon said spool.

* * * * *